US008727863B2

(12) United States Patent
Gurule

(10) Patent No.: US 8,727,863 B2
(45) Date of Patent: May 20, 2014

(54) BONUS WHEEL SUPER-ROULETTE GAMING SYSTEM AND METHOD

(75) Inventor: Chris J. Gurule, Henderson, NV (US)

(73) Assignee: Concept Gaming, LLC, Albuquerque, NM (US)

( * ) Notice: Subject to any disclaimer, the term of this patent is extended or adjusted under 35 U.S.C. 154(b) by 288 days.

(21) Appl. No.: 13/031,471

(22) Filed: Feb. 21, 2011

(65) Prior Publication Data

US 2012/0172102 A1 Jul. 5, 2012

Related U.S. Application Data

(60) Provisional application No. 61/429,823, filed on Jan. 5, 2011.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/17; 463/20; 463/25; 273/139

(58) Field of Classification Search
USPC ................. 273/139, 142, 143; 463/17, 20, 25
See application file for complete search history.

(56) References Cited

U.S. PATENT DOCUMENTS

D273,310 S 4/1984 Pohanka
5,755,440 A 5/1998 Sher
5,823,873 A 10/1998 Moody
6,224,483 B1 * 5/2001 Mayeroff ........................ 463/20
6,497,409 B2 12/2002 Mathews
6,616,530 B2 9/2003 Pearce et al.
6,869,359 B1 3/2005 Mathews
6,890,255 B2 5/2005 Jarvis et al.
7,553,233 B2 6/2009 Jarvis et al.
7,669,850 B1 3/2010 Miller
2006/0009274 A1 1/2006 Finocchio
2006/0055109 A1 * 3/2006 Yokota et al. ............. 273/142 R
2007/0120320 A1 * 5/2007 Miltenberger et al. ... 273/143 R
2008/0076507 A1 * 3/2008 Wertheimer .................... 463/17
2008/0132315 A1 6/2008 Fisher et al.
2008/0214266 A1 9/2008 Phillips et al.
2009/0227316 A1 9/2009 Grubmuller
2010/0279757 A1 * 11/2010 Glenn et al. .................... 463/17
2011/0006477 A1 1/2011 Miller et al.
2011/0059790 A1 3/2011 Slomiany et al.
2011/0092270 A1 4/2011 Jarvis et al.
2012/0122545 A1 5/2012 Watkins et al.

* cited by examiner

*Primary Examiner* — Adetokunbo O Torimiro

(74) *Attorney, Agent, or Firm* — Kermit D. Lopez; Luis M. Ortiz; Ortiz & Lopez, PLLC

(57) ABSTRACT

A video-based super-roulette gaming system which includes a main/primary roulette wheel and a secondary multiplier bonus wheel. The primary roulette wheel includes a number of ball pockets with betting marks and a circular runway for rotating a graphical game ball within the primary roulette wheel. The secondary bonus wheel rotates within the vicinity of the primary roulette wheel in order to provide multiplied potential win for a player(s). A bonus spot with a hole and a path located on the primary roulette wheel transfers the game ball from the primary roulette wheel to the secondary bonus wheel when the game ball lands upon the bonus spot. A multimedia device generates animation and/or sound during the transfer of the game ball from the primary roulette wheel to the secondary bonus wheel in order to enhance spontaneity and excitement of the player within the video-simulated casino environment.

20 Claims, 7 Drawing Sheets

BONUS WHEEL SUPER-ROULETTE GAMING SYSTEM AND METHOD

CROSS-REFERENCE TO PROVISIONAL PATENT APPLICATION

This patent application claims the benefit under 35 U.S.C. §119(e) of U.S. Provisional Application Ser. No. 61/429,823 entitled, "Bonus Wheel Super-Roulette Gaming System and Method," which was filed on Jan. 5, 2011 and is incorporated herein by reference in its entirety.

TECHNICAL FIELD

Embodiments are generally related to electronic gaming systems. In particular, embodiments are related to the game of roulette. Embodiments are further related to video/electronic based roulette and gaming systems utilized in casinos and other places of gambling.

BACKGROUND OF THE INVENTION

Roulette is a well-established casino game of chance having a horizontal wheel, a roulette ball, and a betting table. The horizontal wheel generally includes one or more numbered pockets around its periphery mounted at the bottom of a bowl shaped housing and adapted to rotate about a vertical axis. The numbers with respect to each pocket in the horizontal wheel are typically displayed with a color such as, for example, black or red color based on the background on which the number is marked. A video/electronic based roulette game may be played via a stand-alone gaming machine (e.g., one player, one gaming machine) and/or a community-type gaming machine (e.g., one centered virtual wheel and one virtual betting layout with many betting stations within the vicinity), which can generate a video simulation of the betting table, the horizontal wheel, and the game ball at an electronic display screen.

A conventional roulette wheel generally includes thirty-eight numbered pockets having numbers "0," "00," and 1-36. A number/position can be determined when one of the numbers/positions is randomly selected by the roulette wheel's game ball, A winning bet occurs when the player's selection (or bet) includes the winning number/position. A winning pay (i.e., the payout) can be determined by game's paytable. Examples of paytables are indicated below.

It is believed that a need exists for an improved transparent casino gaming system. A need also exists for an improved video-based bonus wheel super-roulette gaming system, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved casino gaming system.

It is another aspect of the disclosed embodiment to provide for an improved video-based roulette wheel.

It is a further aspect of the disclosed embodiment to provide for an improved bonus wheel super-roulette gaming system.

The aforementioned aspects and other objectives and advantages can now be achieved as described herein. A video-based super-roulette gaming system which includes a main/primary roulette wheel and a secondary multiplier bonus wheel is disclosed herein. The primary roulette wheel includes a number of ball pockets with betting marks and a circular runway for rotating a graphical game ball within the primary roulette wheel. The secondary bonus wheel rotates within the vicinity of the primary roulette wheel in order to provide multiplied potential win(s) for a player(s). A bonus spot(s) exist on the primary roulette wheel and the ball transfers from the primary roulette wheel to the secondary bonus wheel when the game ball lands on the bonus spot. A multimedia device (e.g., an electronic display and a speaker) generates animation and/or sound during the transfer of the game ball from the primary roulette wheel to the secondary bonus wheel in order to enhance spontaneity and excitement for the player during game play.

The video-based roulette gaming system configuration may be a stand-alone machine and/or a community-type gaming presentation having a modified pay table and changed game play characteristic that will provide a new game with enhanced volatility values for each available wager and a different more exciting experience for the player. The system also includes an electronic display for displaying the roulette wheel. An input device (e.g., touch screen, roller ball, touch pad, mouse, and push buttons) operably associated with the electronic display can be employed for entering the individual numbers and betting selections by the player.

The pay table can be modified from a traditional roulette pay table for each available bet (e.g., Traditional roulette single-number bet pays 35-1, Super Roulette single-number bet pays 31-1 when won on the primary wheel, offering the possibility to win the bonus wheel spin and win the straight bet during the bonus wheel spin which would pay the player 124-1 when a 4× multiplier wheel would be offered). The secondary bonus wheel of the gaming system may be configured as a set multiplier (e.g., 4×), multiple bonus multiplier values on more than one available bonus wheel (e.g., 2×, 3× and 4×), or as a mystery bonus wheel (e.g., ?× where the player knows the minimum and maximum values of the bonus wheel multiplier value of 2×-8×, but could be any value in between and is chosen at random during the beginning of the bonus game).

The configuration of this game can be based on the operator's preference. The secondary bonus wheel along with the primary roulette wheel offers a new gaming experience with modified house advantage values (e.g., Traditional roulette straight bet hold %=5.26% where the above super roulette straight bet offers a hold % of 9.51%), hit frequency and volatility (e.g., Standard Deviation SD for a straight bet on a traditional roulette=5.76 where SD for the same bet on the above given example=5.998). Such a "super-roulette" gaming approach creates added value to a slot floor, an improved game mix for the operator, and adds an exciting twist within a casino environment.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
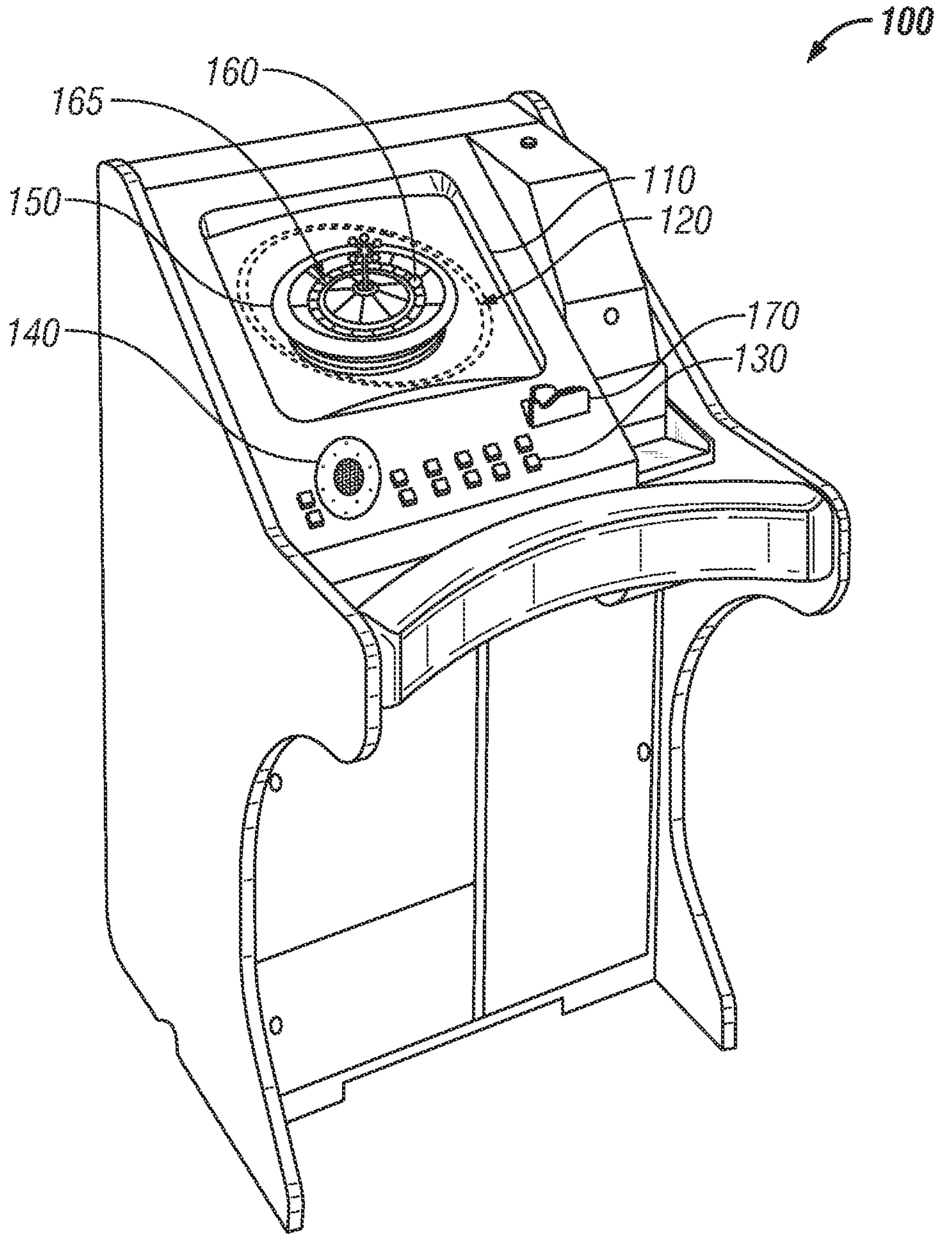
FIG. 1 illustrates a perspective view of an electronic super-roulette gaming system, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one skilled in the art, the present invention can be embodied as a method, data processing system, or computer program product, Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, VisualBasic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIG. 1 illustrates a perspective view of a video-based super-roulette gaming system 100, in accordance with the disclosed embodiments. The super-roulette gaming system 100 can be employed in a wide range of casino environments in order to permit an operator to offer an exciting roulette game with increased/changeable house advantage values, hit frequency, and volatility. Note that the video-based gaming system 100 can be a stand-alone machine and/or a community type gaming machine having the potential and technology to provide enhanced volatility and exciting experience with respect to the player of casino, depending upon design considerations.

The term "casino" can be defined as a facility that houses and accommodates certain types of gambling activities in environments such as hotels, restaurants, retail shopping, cruise ships, and other tourist attractions. The gaming system 100 includes an electronic display 110, an input device 130 and 120, a multimedia device 140, and a payment terminal 170. The gaming system 100 disclosed herein may be typically implemented in the context of a data-processing system such as, a gaming kiosk, a personnel computer and/or a laptop that includes, for example, a central processor, a main memory, an input/output controller, the input device 120 and 130, a mass storage (e.g., a hard disk), and a USB (Universal Serial Bus) peripheral connection.

The input device 120 and 130 can be, for example, a touch screen, roller ball, touch pad, mouse, and push buttons operably associated with the electronic display 110 for entering the individual number and betting selections by a player of the casino. As illustrated, the various components of the gaming system 100 can communicate electronically through a system bus or similar architecture. The system bus may be, for example, a subsystem that transfers data between, for example, computer components within the gaming system 100 or to and from other data-processing devices, components, computers, etc.

The electronic display 110 of the gaming system 100 typically displays a video-based roulette wheel 150 that is incorporated with a realistic simulation of a game ball 160. The electronic display 110 associated with the gaming system 100, which is preferably a graphical user interface (GUI), can serve to display results of the roulette game, whereupon the player may supply additional inputs and/or terminate a particular session. Note that the primary techniques for enhancing the realistic movement in the game ball 160 can be separately implemented in the gaming system 100. The roulette wheel 150 can be a pre-recorded graphical simulation over which the game ball 160 rotates at a constant rate. In such a gaming system 100, the processing can be basically limited by substantially simplifying the hardware and software requirements in the casino setting.

Figure 2:
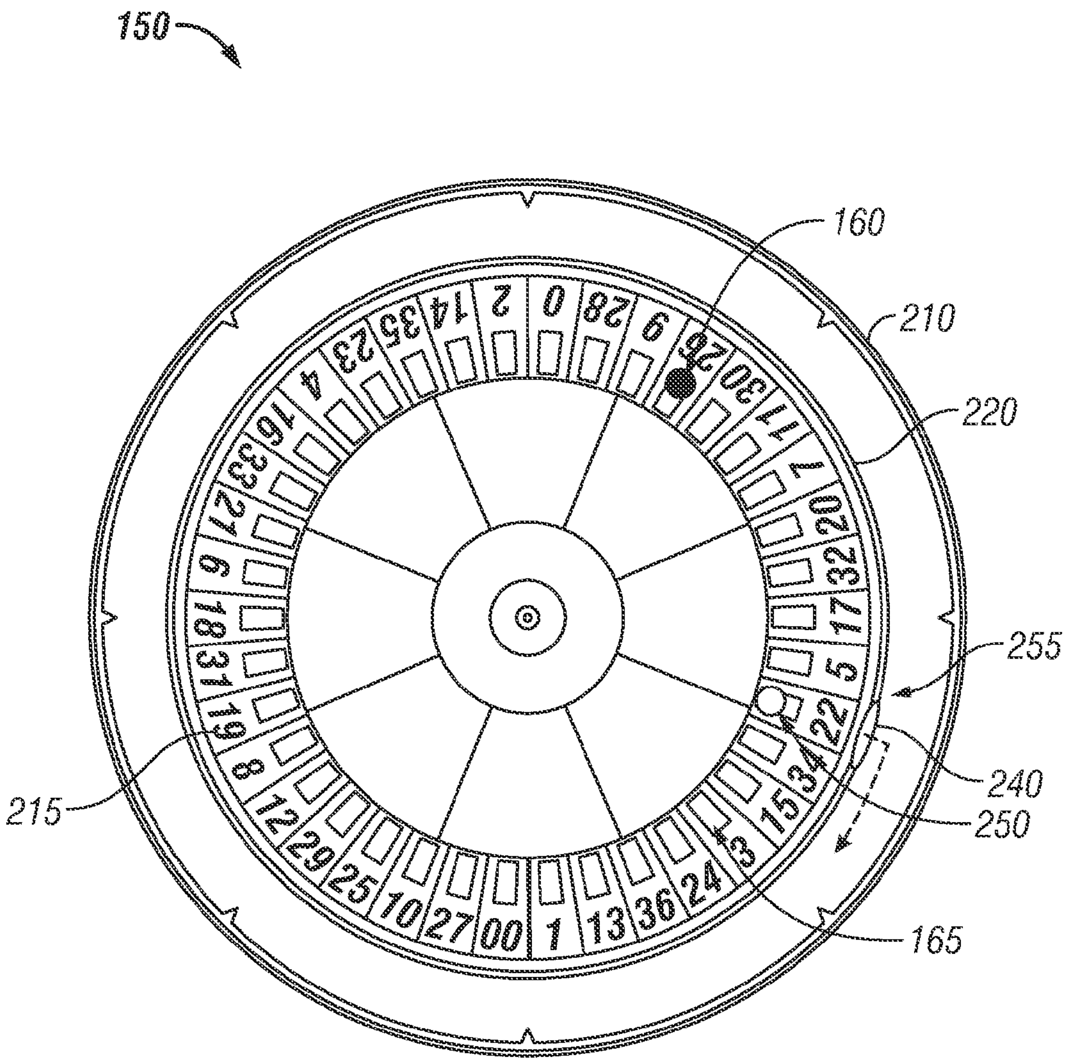
FIG. 2 illustrates a top view of the super-roulette wheel with a mystery multiplier secondary wheel, in accordance with the disclosed embodiments.

The roulette wheel 150 includes a number of ball pockets such as a ball pocket 215 and a circular runway 165 for rotating the graphical game ball 160 within the roulette wheel 150, as shown in FIG. 2. The player of the casino can typically select the wagers and launch the game ball 160 into the roulette wheel 150 in order to obtain rewards and/or fun based on the nature of the wager. The roulette game can also be played on varying other representations such as an electrical, a mechanical, an electro-mechanical, and/or a video representation of the roulette wheel 150. The payment terminal 170 such as, for example, a card reader and/or other terminal of the gaming system 100 can be employed for receiving payments, charging the player or tracking the player's gaming activity within the gaming system 100. The player can access the gaming system 100 by inserting coins, paper currency, tokens, a debit card; a credit card, a smart card or the like into the terminal 170 of the gaming system 100.

The gaming system 100 described herein is intended as an example and not as an architectural limitation with respect to particular embodiments. Such embodiments, however, are not limited to any particular application or any particular computing or data-processing environment. Instead, those skilled in the art will appreciate that the disclosed system and method may be advantageously applied to a variety of system and application software. Moreover, the present invention may be embodied on a variety of different computing platforms, including Macintosh, UNIX, LINUX, and the like.

FIG. 2 illustrates a top view of a roulette wheel 150 with a mystery multiplier bonus wheel 210, in accordance with the disclosed embodiments. The secondary multiplier bonus wheel 210 of the roulette wheel 150 can also act as a mystery multiplier based on operator preferences. A pay table (not shown in FIG. 2) can be modified to display a bonus wheel payout (e.g., a credit/bonus payout) and provide a bet pay with respect the players in the casino. The pay table can provide a straight-up single number bet pay of, for example, a 34:1 ratio, by redistributing a new held coin-out via the bonus wheel payouts.

The roulette wheel 150 described herein typically depicts an American style roulette wheel design. However, the roulette wheel 150 need not be an exact replica of a traditional American style roulette wheel. Other types of roulette wheels such as, for example, a European style roulette wheel can be utilized in the place of the suggested, depending upon design considerations. The numbers and/or colors of the pockets 215 in a primary roulette wheel 220 can be arranged in a different manner such as by introducing more or few numbers and/or by replacing the numbers with a symbol (e.g., a fruit). The roulette wheel 150 can be spun and/or made to appear spin in order to provide visual stimulation and to emphasize the random nature of the number generation in the gaming system 100. The super-roulette gaming system therefore creates added values to the slot floor and an improved game mix to the players by adding an exciting twist within the casino environment.

The roulette wheel 150 can be configured to include the main/primary video roulette wheel 220 and the secondary bonus wheel 210. The primary roulette wheel 220 can include, in some embodiments, one or more numbered pockets 215 bearing betting marks around its periphery. The numbers of each pocket 215 in the primary roulette wheel 220 can be graphically displayed with a color such as a black or red based on the background on which the number is marked. Each pocket 215 in the primary wheel 220 can be formed by a divider and referred to by the corresponding field. For example, the "0" pocket is aligned with the "0" field.

The circular runway 165 of the primary roulette wheel 220 is generally continuous and tilted inward from the vertical plane by an angle. The joint between the circular runway 165 and the circular wall of the primary wheel 220 has a curvature radius slightly smaller than the radius of the game ball 160. Such an arrangement brings the game ball 160 running along the outermost circumference of the circular runway 165 in contact with the primary roulette wheel 220. The primary roulette wheel 220 can further include, in some embodiments, a bonus spot 255 with a hole 250 and a path 240 to the secondary multiplier bonus wheel 210 in order to provide a bonus and/or jackpot to the player when the game ball 160 lands upon the bonus spot 255 and transferred to the secondary multiplier bonus wheel 210. The secondary multiplier bonus wheel 210 spins within the vicinity of the primary roulette wheel 220 in order to provide multiplied potential win for the players.

In some embodiments, the secondary multiplier bonus wheel 210 of the gaming system 100 can act as a standard set multiplier by providing multiple bonus wagers with respect to the player of the casino. For example, at the 22 position on the primary wheel 220, the player can have a chance to win on the secondary multiplier bonus wheel 210. If the game ball 160 landed upon the bonus spot 255 of the primary wheel 220 and transferred to the secondary multiplier wheel 210, then the player can be awarded with multiple bonuses such as 2× to 7× multiple bonus wagers in casino gaming. The multimedia device such as the electronic display 110 and a speaker 140 generates sounds during the transfer of the game ball 160 from the primary roulette wheel 220 to the secondary multiplier bonus wheel 210 in order to thereby enhance the spontaneity and excitement of the player within the video-simulated casino environment.

Figure 3:
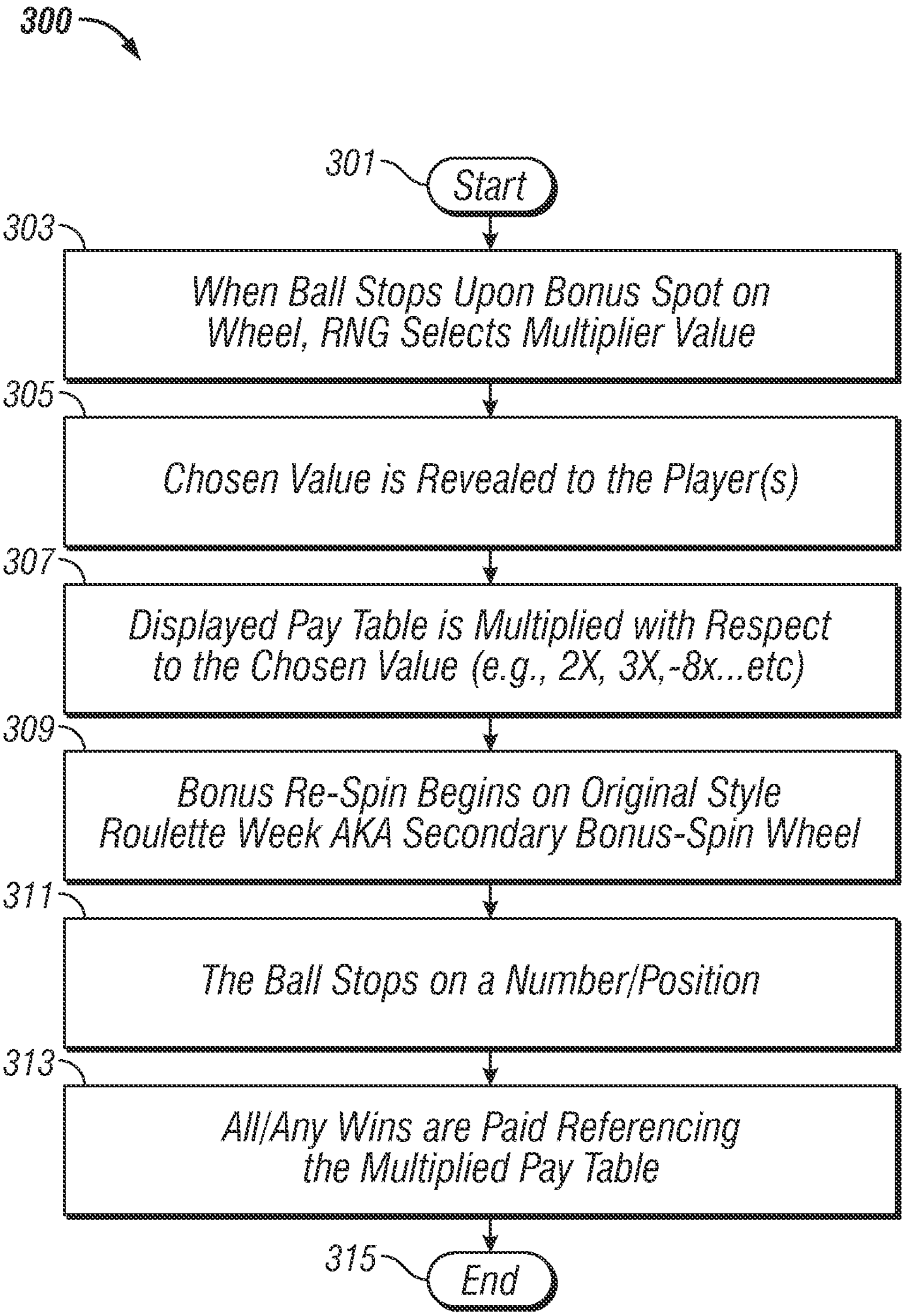
FIG. 3 illustrates a flow chart of operations depicting a mystery multiplier method, in accordance with the disclosed embodiments.

FIG. 3 illustrates a flow chart of operations depicting a mystery multiplier method 300, in accordance with the disclosed embodiments. Thus, as indicated at block 301, the process of method 300 can be initiated. Next, as illustrated at block 303, when the ball stops upon the bonus spot on a wheel such as that depicted in FIG. 7 herein, for example, (in this case the spot my have an indicator such as 2×-8× ?, also the spot may be represented more than once on the primary wheel) an RNG (Random Number Generator) can automatically select a multiplier value. Then, as depicted at block 305, the chosen value can be revealed to the player(s). Thereafter, as illustrated at block 307, the graphically displayed pay table can then be multiplied with respect to the chosen value (e.g., 2×, 3×-8× . . . etc). Next, as depicted at block 309, a bonus re-spin begins via, for example, an original style roulette wheel AKA the secondary bonus-spin wheel (in this particular case), and then as indicated at block 311, the ball stops on a number/position. Thereafter, as described at block 313, all/any wins can be paid referencing the multiplied pay table. The process can then terminate, as depicted at block 315.

Note that example pay tables are indicated below related to a game with a bonus spot represented once on, for example, the primary roulette wheel 220 and as a 4× multiplier value.

Figure 4:
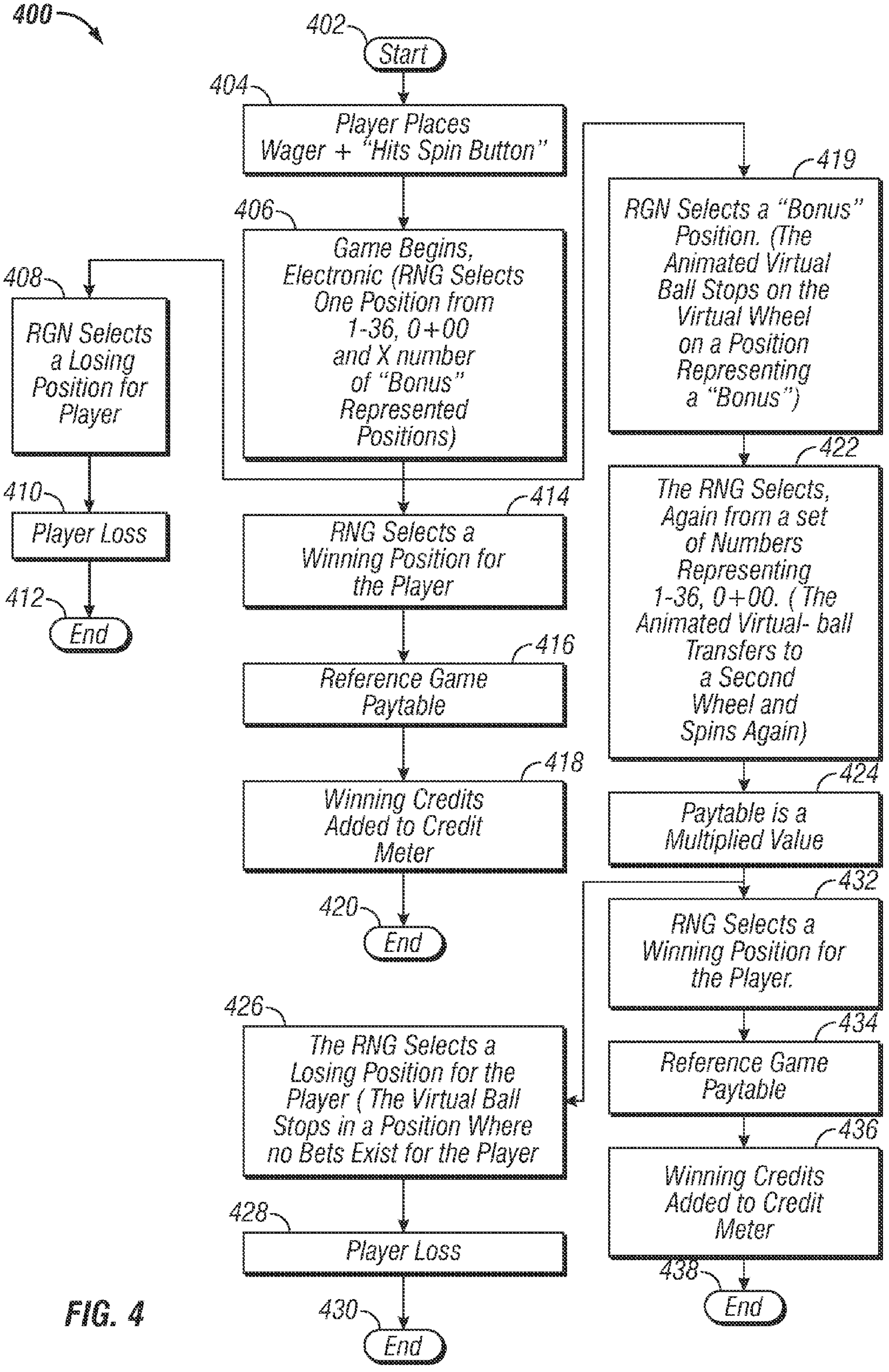
FIG. 4 illustrates a high-level flow chart of operations depicting logical operational steps of a method for electronic super-roulette, in accordance with the disclosed embodiments.

FIG. 4 illustrates a high-level flow chart of operations depicting logical operational steps of a method 400 for electronic super-roulette, in accordance with the disclosed embodiments. As indicated at block 402, the process can be initiated. Next, as depicted at block 404, in the context of the electronic "super roulette" gaming approach as described herein, a user or player can place a wager and then select or access a "hits spin button" via an electronic gaming device or system such as, for example, the gaming system 100 discussed above. Thereafter, as described at block 406, the roulette game begins and electronically and/or via software, an RNG (Random Number Generator) selects one position from 1-36, 0+00, and an "X" number of "bonus" represented positions. In the context of an electronic gaming system such as, for example, gaming system 100, an animated "virtual" ball spins graphically via the display of a modified video-roulette wheel.

Thereafter, several scenarios are possible. These scenarios can be broken down into the logical steps represented by blocks 408, 410, 412; blocks 414, 416, 418, 420; blocks 419, 422, 424; blocks 426, 428, 430; and blocks 432, 434, 436, 438. Thus, as depicted at block 408, the RNG can select a losing position for the user or player. Thereafter, as indicated at block 410, the player loses, and the process then terminates, as indicated at block 412. Note that the animated virtual ball described above stays in position where no bets exist for the player/user. Alternatively, as depicted at block 414, the RNG can select a winning position for the player/user and then, as depicted at block 416, a reference game paytable is displayed via a display of, for example, the system 100 described herein. Then, as described at block 418, winning credits can be added to a credit meter. The process can then terminate, as indicated at block 420. Note with respect to the operations indicated at blocks 414, 416, 418, the animated virtual ball can stop in a position where bets exist for the player/user.

Turning now to the logical operations illustrated at block 419, the RNG can select a "bonus" position. In the context of this operation, the animated virtual ball stops on the virtual wheel on a position representing a "bonus". Thereafter, as depicted at block 422, the RNG selects again from a set of numbers representing, 1-36, 0+00. Here, the animated virtual ball can be transferred graphically to a second wheel and spins again. Next, as shown at block 424, the roulette paytable is a multiplied value. Two paths are then possible, following processing of the operation shown at block 424. First, as indicated at block 426, the RNG can select a losing position for the player. Here the virtual ball described earlier can stop in a position where no bets exist for the player. Then, as indicated at block 428, the player/user loses. The process then terminates, as indicated at block 430. The second path begins, as indicated at block 432. Thus, as described at block 432, the RNG can select a winning position for the player and then, as described at block 434, a reference game table is displayed. Then, as illustrated at block 436, winning credits can be added to the credit meter. The process then terminates, as indicated at block 438.

Figure 5:
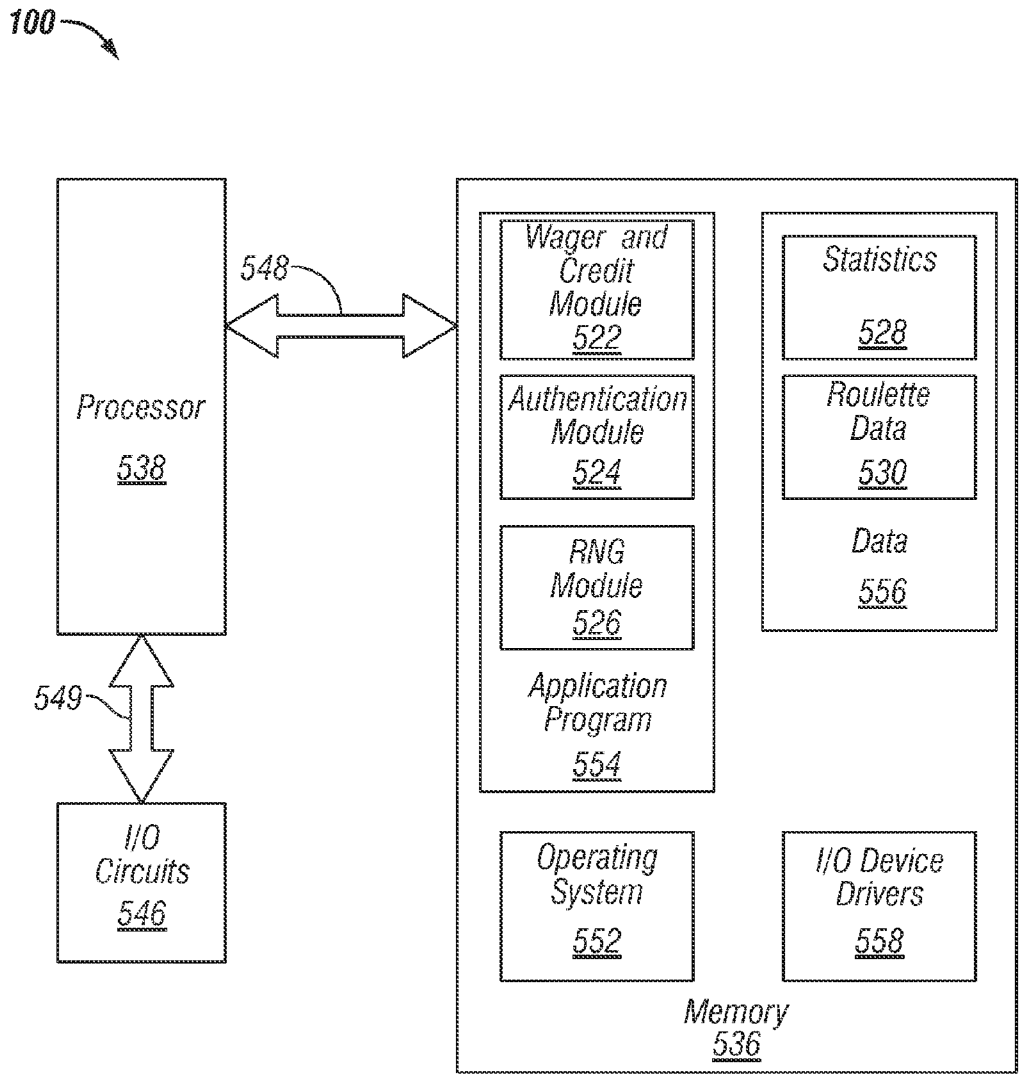
FIG. 5 illustrates an exemplary data processing system or electronic roulette module/database environment that may be included in devices operating in accordance with some embodiments.

Referring now to FIG. 5, an exemplary data processing system 100 or electronic roulette module/database environment that may be included in devices operating in accordance with some embodiments of the present invention will be discussed. Note that the data-processing system 100 disclosed in FIG. 5 can be utilized as or in the context of the electronic roulette system 100 discussed earlier.

As illustrated in FIG. 5, the data processing system 100 can be configured to a processor 538, a memory 536, and input/output circuits 546. The data-processing system 100 may be incorporated in, for example, a personal computer, a portable wireless hand held device (e.g., Smartphone, etc.), server, router or the like, and/or may also be implemented in the context of a gaming system such as the roulette gaming system 100 discussed earlier. The processor 538 communicates with the memory 536 via an address/data bus 548 and communicates with the input/output circuits 546 via an address/data bus 549. The input/output circuits 546 can be used to transfer information between the memory 536 and another computer system or a network using, for example, an Internet Protocol (IP) connection and/or wireless or wired communications. These components may be conventional components such as those used in many conventional data processing systems, which may be configured to operate as described herein.

In particular, the processor 538 can be any commercially available or custom microprocessor, microcontroller, digital signal processor or the like. The memory 536 may include any memory devices containing the software and data used to implement the functionality circuits or modules used in accordance with embodiments of the present invention. The memory 536 can include, but is not limited to, the following types of devices: cache, ROM, PROM, EPROM, EEPROM, flash memory, SRAM, DRAM, and magnetic disk. In some embodiments of the present invention, the memory 536 may be, for example, a content addressable memory (CAM).

As further illustrated in FIG. 5, the memory 536 may include several categories of software and data used in the data processing system 100: an operating system 552; application programs 554; input/output device drivers 558: and data 556. As will be appreciated by those skilled in the art, the operating system 552 may be any operating system suitable for use with a data processing system such as, for example, Linux, Windows XP, Mac OS, Unix, etc. The input/output device drivers 558 typically include software routines accessed through the operating system 552 by the application programs 554 to communicate with devices such as the input/output circuits 546 and certain memory 536 components. The application programs 554 are illustrative of the programs that implement the various features of the circuits and modules according to some embodiments of the present invention.

Finally, the data 556 represents static and dynamic data that can be used by the application programs 554, the operating system 552, the input/output device drivers 558, and other software programs that may reside in the memory 536. As illustrated in the example of FIG. 5, the data 556 may include, for example, statistics 528 and roulette information 530 for use by the circuits and modules of the application program(s) 554 according to some embodiments of the present invention as discussed further herein. The event information, for example, may include data associated with a particular event. Statistics 528 may include, for example, not only statistical information related to a particular gaming or a group of games, but also broader statistics such as, for example, roulette gaming history and scores.

In the embodiment shown in FIG. 5, applications program(s) 554 can include, for example, a wagering and credit module 522, a security or authentication module 524, an RNG module 526, and so forth. While the present invention is illustrated with reference to the wagering and credit module 522, the authentication module 524, and the RNG module 526 being application program(s) in FIG. 5, as will be appreciated by those skilled in the art, other configurations fall within the scope of the present invention. For example, rather than being application program(s) 554, these modules may also be incorporated into the operating system 552 or other such logical division of the data processing system 100. In some embodiments, for example, the wagering and credit module 522 can implement instructions for generating a graphical display of the roulette tables discussed herein, in addition to managing the credit meter described at, for example, block 436 of FIG. 4.

Furthermore, while the modules 522, 524, and 526 are illustrated in a single data processing system, as will be appreciated by those skilled in the art, such functionality may be distributed across one or more data processing systems. Thus, the present invention should not be construed as limited to the configuration illustrated in FIG. 5, but may be provided by other arrangements and/or divisions of functions between data processing systems. For example, although FIG. 5 is illustrated as having various circuits/modules, one or more of these circuits may be combined without departing from the scope of the present invention.

As utilized herein, the term "module" can refer to a collection or routines (and/or subroutines) and/or data structures that performs a particular task or implements a particular abstract data type. Modules usually include two parts: an interface, which lists the constants, data types, variables, and routines that can be accessed by other modules or routines, and an implementation, which is typically, but not always, private (accessible only to the module) and which contains the source code that actually implements the routines in the module. The term "module" may also refer to a self-contained component that can provide a complete function to a system and can be interchanged with other modules that perform similar functions.

Figure 6:
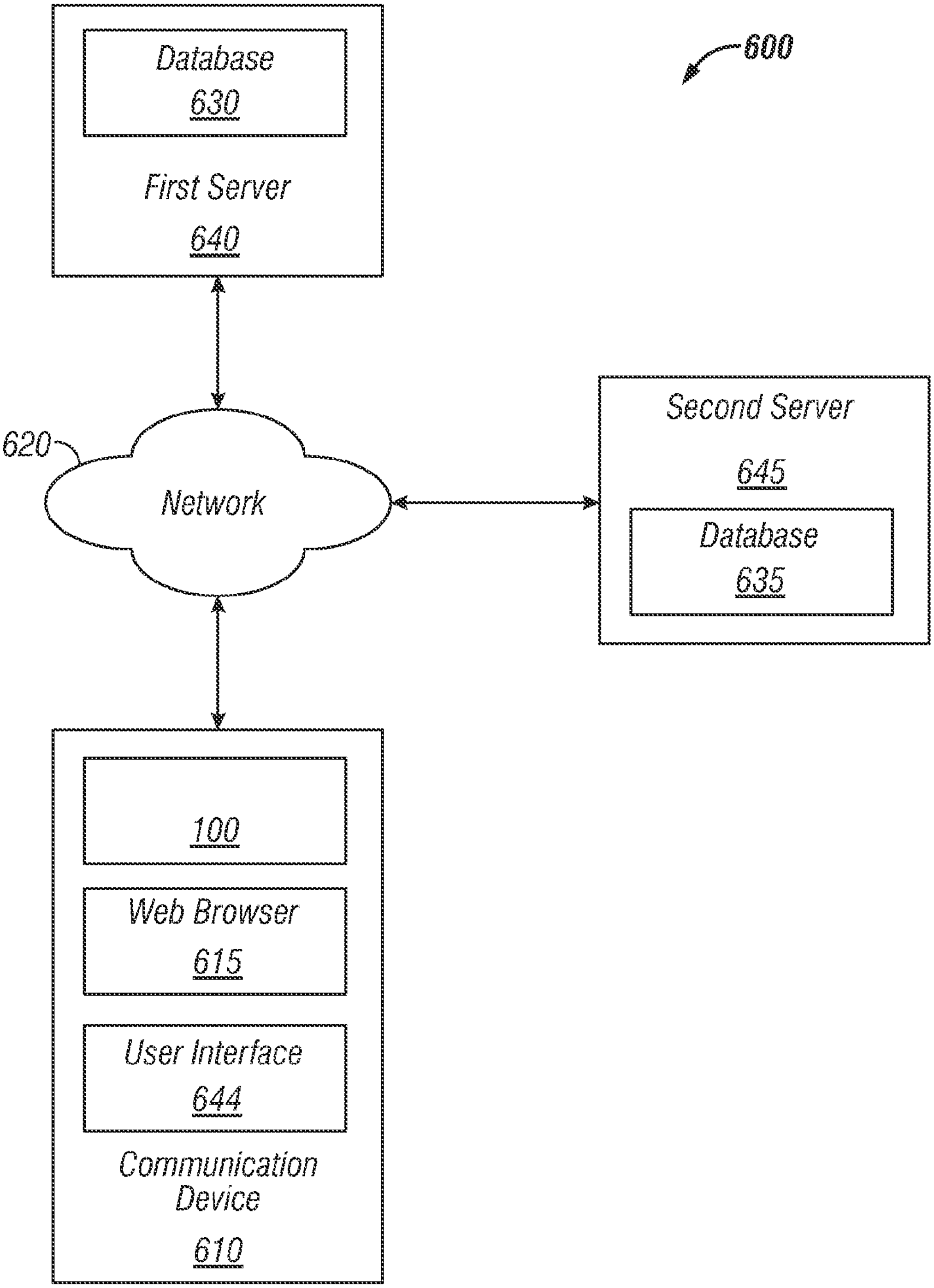
FIG. 6 illustrates an exemplary environment depicting operations and devices according to some embodiments.

Referring now to FIG. 6, an exemplary environment 600 for operations and devices according to some embodiments will be discussed. As illustrated in FIG. 6, the environment 600 may include a communications/computing device 610, a data communications network 620, a first server 640, a second server 645, and/or additional servers not shown herein. It can be appreciated that additional servers may be utilized with respect to network 620. It can also be appreciated that in some embodiments, only a single server such as server 640 may be required. In general, the communications device 610 allows a user of the communications device 610 to view a graphically displayed roulette game via, for example, the user interface 644 and/or a web browser 615 and also interactively engage in an electronic "super roulette" game as described herein utilizing bi-directional communications of the remote device 610 with one or more servers 640, 645, etc. over the data communications network 620.

As illustrated, the communications device 610 illustrated in FIG. 6 may include the system 100. For example, the application program(s) 554 discussed with respect to FIG. 5 could be included as part of the system 100 of the communications device 610. The communications device 610 may be, for example, a laptop computer, a desktop computer, a personal data assistant (PDA), Smartphone, a web capable mobile terminal or any device capable of communicating with the network 620. The communications device 610 may also simply be a gaming device such as a casino based electronic roulette gaming device.

The communications device 610 may include, for example, user interface 644, which may be used to interactively engage in an electronic "super roulette" game according to some embodiments of the present invention, and web browser 615, which may be accessed through the user interface 644, according to some embodiments of the present invention. As discussed above, the system 100 may be configured to permit a user to engage in the disclosed electronic "super roulette" game via the communications device 610. The first server 640 may include a database 630 and the second server 645 may include a database 635.

The communications device 610 may communicate over the network 620, for example, the Internet, through a wireless communications link, an Ethernet connection, a telephone line, a digital subscriber link (DSL), a broadband cable link, or other wireless links, etc. The first and second servers 640 and 645 may also communicate over the network 620. Thus, the network 620 may convey data between the communications device 610 and the first and second servers 640 and 645. The network 620 can be, for example, a wireless communications network such as, for example, a cellular communications network or 802.11/WiFi network. The network 620 can also be a client-server network.

The remote computing device 610 can be, for example, a desktop computer, a laptop computer, a set-top box, or a portable wireless handheld devices such as a Smartphone and/or PDA. The remote computing device 610 can also be, for example, a device such as an iPad type computing device.

Figure 7:
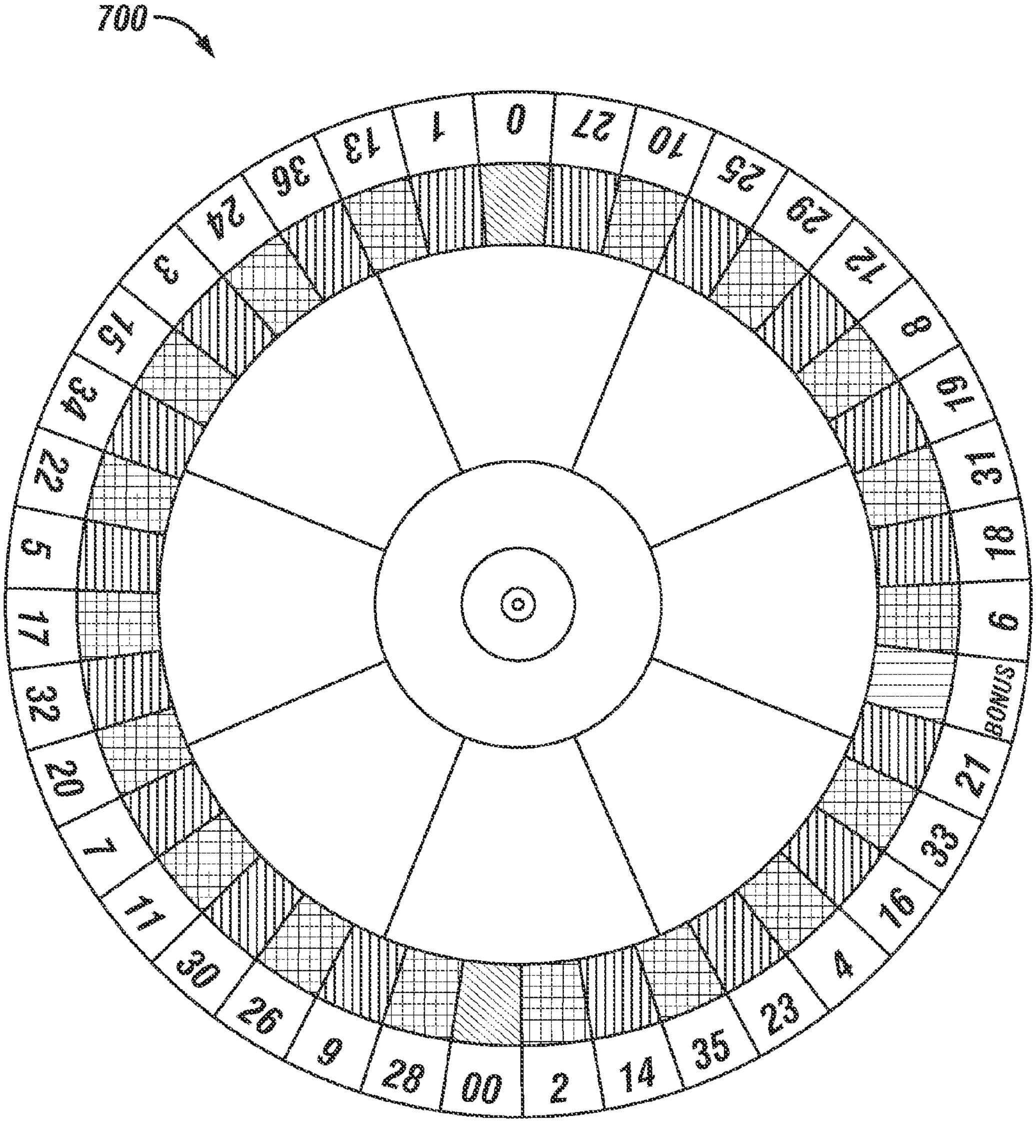
FIG. 7 illustrates a top view of a primary game wheel, which can be utilized in accordance with the disclosed embodiments.

FIG. 7 illustrates a top view of a primary game wheel 700, which can be utilized in accordance with the disclosed embodiments. The "bonus" position, which is represented in the configuration depicted in FIG. 7 is not concrete, meaning that the game may have more than one "Bonus" positions on different games within this same game. This single "Bonus" position sketch represents the game in its most simplistic form. Also the value of the multiplier is 2 or greater and may be mixed with the number of represented positions and pay table values possibly infinitely under this game scenario. Note that example paytables are indicated below with respect to Tables 1-7.

TABLE 1

Super! Double-Zero Roulette Straight-Up Bet (One 4X Bonus Multiplier)
Calculations based or 1 unit wagered (i.e. $1.00)

| A<br>Net Pay | B<br>Probability | C<br>Sum (A × B) | D<br>mean | E<br>$x_i$ − mean | F<br>$E^2$ | G<br>B × F |
|---|---|---|---|---|---|---|
| $1.00 | 0.97368 | 0.97368 | 0.09514 | 0.90486 | 0.81877 | 0.79722 |
| $(31.00) | 0.02564 | −0.79487 | 0.09514 | −31.09514 | 966.90784 | 24.79251 |
| $(124.00) | 0.00067 | −0.08367 | 0.09514 | −124.09514 | 15399.60419 | 10.39110 |
| | 1.00000 | 0.09514170 | | | | 35.98083 |
| | | MEAN (EV) | | | | VARIANCE |
| | | 9.51 | Hold % | | | 5.998402004 |
| | | | | | | SD |

| Z | corresponding C.I. |
|---|---|
| 1.65 | 90% |
| 1.96 | 95% |

| (A)<br>games played | (B)<br>B<br>sqrt(games) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 11.75687 | 11.75687 | −1166.17% | 9.51% | 1185.20% |
| 50 | 7.071067812 | 11.75687 | 1.66267 | −156.75% | 9.51% | 175.78% |
| 100 | 10 | 11.75687 | 1.17569 | −108.05% | 9.51% | 127.08% |
| 175 | 13.22875656 | 11.75687 | 0.88874 | −79.36% | 9.51% | 98.39% |
| 1,000 | 31.6227766 | 11.75687 | 37.18% | −27.66% | 9.51% | 46.69% |
| 10,000 | 100 | 11.75687 | 0.11757 | −2.24% | 9.51% | 21.27% |
| 32,768 | 181.019336 | 11.75687 | 0.06495 | 3.02% | 9.51% | 16.01% |
| 1,000,000 | 1000 | 11.75687 | 0.01176 | 8.34% | 9.51% | 10.69% |
| 10,000,000 | 3162.27766 | 11.75687 | 0.00372 | 9.14% | 9.51% | 9.89% |

TABLE 2

Super! Double-Zero Roulette Split Bet (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ − mean | F<br>$E^2$ | G<br>B × F |
|---|---|---|---|---|---|---|
| $1.00 | 0.94737 | 0.94737 | 0.09717 | 0.90283 | 0.81511 | 0.77221 |
| $(15.00) | 0.05128 | −0.76923 | 0.09717 | −15.09717 | 227.92442 | 11.68843 |
| $(60.00) | 0.00135 | −0.08097 | 0.09717 | −60.09717 | 3611.66936 | 4.87405 |
| | 1.00000 | 0.09716599 | | | | 17.33469 |
| | | MEAN (EV) | | | | VARIANCE |
| | | 9.72 | Hold % | | | 4.163494725 |
| | | | | | | SD |

| Z | corresponding C.I. |
|---|---|
| 1.65 | 90% |
| 1.96 | 95% |

| (A)<br>games played | (B)<br>B<br>sqrt(qames) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 8.16045 | 8.16045 | −806.33% | 9.72% | 825.76% |
| 50 | 7.071067812 | 8.16045 | 1.15406 | −105.69% | 9.72% | 125.12% |
| 100 | 10 | 8.16045 | 0.81604 | −71.89% | 9.72% | 91.32% |
| 175 | 13.22875656 | 8.16045 | 0.61687 | −51.97% | 9.72% | 71.40% |
| 1,000 | 31.6227766 | 8.16045 | 25.81% | −16.09% | 9.72% | 35.52% |
| 10,000 | 100 | 8.16045 | 0.08160 | 1.56% | 9.72% | 17.88% |
| 32,768 | 181.019336 | 8.16045 | 0.04508 | 5.21% | 9.72% | 14.22% |
| 1,000,000 | 1000 | 8.16045 | 0.00816 | 8.90% | 9.72% | 10.53% |
| 10,000,000 | 3162.27766 | 8.16045 | 0.00258 | 9.46% | 9.72% | 9.97% |

TABLE 3

Super! Double-Zero Roulette 3 Number Street Bet (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ − mean | F<br>$E^2$ | G<br>B × F |
|---|---|---|---|---|---|---|
| $1.00 | 0.92105 | 0.92105 | 0.11336 | 0.88664 | 0.78613 | 0.72407 |
| $(9.50) | 0.07692 | −0.73077 | 0.11336 | −9.61336 | 92.41670 | 7.10898 |
| $(38.00) | 0.00202 | −0.07692 | 0.11336 | −38.11336 | 1452.62824 | 2.94054 |
| | 1.00000 | 0.11336032 | | | | 10.77359 |
| | | MEAN (EV) | | | | VARIANCE |
| | | 11.34 | Hold % | | | 3.282314227 |
| | | | | | | SD |

| Z | corresponding C.I. |
|---|---|
| 1.65 | 90% |
| 1.98 | 95% |

| (A)<br>games played | (B)<br>B<br>sqrt(qames) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 6.43334 | 6.43334 | −632.00% | 11.34% | 654.67% |
| 50 | 7.071067812 | 6.43334 | 0.90981 | −79.65% | 11.34% | 102.32% |
| 100 | 10 | 6.43334 | 0.64333 | −53.00% | 11.34% | 75.67% |
| 175 | 13.22875656 | 6.43334 | 0.48631 | −37.30% | 11.34% | 59.97% |
| 1,000 | 31.6227766 | 6.43334 | 20.34% | −9.01% | 11.34% | 31.68% |
| 10,000 | 100 | 6.43334 | 0.06433 | 4.90% | 11.34% | 17.77% |
| 32,768 | 181.019336 | 6.43334 | 0.03554 | 7.78% | 11.34% | 14.89% |
| 1,000,000 | 1000 | 8.43334 | 0.00643 | 10.69% | 11.34% | 11.98% |
| 10,000,000 | 3162.27766 | 8.43334 | 0.00203 | 11.13% | 11.34% | 11.54% |

TABLE 4

Super! Double-Zero Roulette 4 Number Corner Bet (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ − mean | F<br>$E^2$ | G<br>B × F |
|---|---|---|---|---|---|---|
| $1.00 | 0.89474 | 0.89474 | 0.10121 | 0.89879 | 0.80782 | 0.72278 |
| $(7.00) | 0.10256 | −0.71795 | 0.10121 | −7.10121 | 50.42725 | 5.17203 |
| $(28.00) | 0.00270 | −0.07557 | 0.10121 | −28.10121 | 789.67826 | 2.13139 |
| | 1.00000 | 0.10121457 | | | | 8.02619 |
| | | MEAN (EV) | | | | VARIANCE |
| | | 10.12 | Hold % | | | 2.833053628 |
| | | | | | | SD |

| Z | corresponding C.I. |
|---|---|
| 1.65 | 90% |
| 1.96 | 95% |

| (A)<br>games played | (B)<br>B<br>sqrt(games) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 5.55279 | 5.55279 | −545.16% | 10.12% | 565.40% |
| 50 | 7.071067812 | 5.55279 | 0.78528 | −68.41% | 10.12% | 88.65% |
| 100 | 10 | 5.55279 | 0.55528 | −45.41% | 10.12% | 65.65% |
| 175 | 13.22875656 | 5.55279 | 0.41975 | −31.85% | 10.12% | 52.10% |
| 1,000 | 31.6227766 | 5.55279 | 17.56% | −7.44% | 10.12% | 27.68% |
| 10,000 | 100 | 5.55279 | 0.05553 | 4.57% | 10.12% | 15.67% |
| 32,768 | 181.019336 | 5.55279 | 0.03068 | 7.05% | 10.12% | 13.19% |
| 1,000,000 | 1000 | 5.55279 | 0.00555 | 9.57% | 10.12% | 10.68% |
| 10,000,000 | 3162.27766 | 5.55279 | 0.00176 | 9.95% | 10.12% | 10.30% |

TABLE 5

Super! Double-Zero Roulette 6 Number (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ – mean | F<br>$E^2$ | G<br>B × F |
|---|---|---|---|---|---|---|
| $1.00 | 0.84211 | 0.84211 | 0.07692 | 0.92308 | 0.85207 | 0.71753 |
| $(4.50) | 0.15385 | −0.69231 | 0.07692 | −4.57692 | 20.94822 | 3.22280 |
| $(18.00) | 0.00405 | −0.07287 | 0.07692 | −18.07692 | 326.77515 | 1.32298 |
| | 1.00000 | 0.07692308 | | | | 5.26331 |
| | | MEAN (EV) | | | | VARIANCE |
| | | 7.69 | Hold % | | | 2.294191278 |
| | | | | | | SD |

| Z | corresponding C.I. |
|---|---|
| 1.65 | 90% |
| 1.96 | 95% |

| (A)<br>games played | (B)<br>B<br>sqrt(games) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 4.49661 | 4.49661 | −441.97% | 7.69% | 457.35% |
| 50 | 7.071067812 | 4.49661 | 0.63592 | −55.90% | 7.69% | 71.28% |
| 100 | 10 | 4.49661 | 0.44966 | −37.27% | 7.69% | 52.66% |
| 175 | 13.22875656 | 4.49661 | 0.33991 | −26.30% | 7.69% | 41.68% |
| 1,000 | 31.6227766 | 4.49661 | 14.22% | −6.53% | 7.69% | 21.91% |
| 10,000 | 100 | 4.49661 | 0.04497 | 3.20% | 7.69% | 12.19% |
| 32,768 | 181.019336 | 4.49661 | 0.02484 | 5.21% | 7.69% | 10.18% |
| 1,000,000 | 1000 | 4.49661 | 0.00450 | 7.24% | 7.69% | 8.14% |
| 10,000,000 | 3162.27766 | 4.49661 | 0.00142 | 7.55% | 7.69% | 7.83% |

TABLE 6

Super! Double-Zero Roulette 12 Number (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ – mean | F<br>$E^2$ | G<br>B × F |
|---|---|---|---|---|---|---|
| $1.00 | 0.68421 | 0.68421 | 0.08907 | 0.91093 | 0.82980 | 0.56775 |
| $(1.75) | 0.30769 | −0.53846 | 0.08907 | −1.83907 | 3.38217 | 1.04067 |
| $(7.00) | 0.00810 | −0.05668 | 0.08907 | −7.08907 | 50.25490 | 0.40692 |
| | 1.00000 | 0.08906883 | | | | 2.01535 |
| | | MEAN (EV) | | | | VARIANCE |
| | | 8.91 | Hold % | | | 1.419628859 |
| | | | | | | SD |

| Z | corresponding C.I. |
|---|---|
| 1.65 | 90% |
| 1.96 | 95% |

| (A)<br>games played | (B)<br>B<br>sqrt(qames) | (C)<br>(z)(SD)<br>Z = 1.96 | (D)<br>(z*sd)/(col B) | (E) Hold Percentage Confidence Interval<br>lower | (F)<br>mean | (G)<br>upper |
|---|---|---|---|---|---|---|
| 1 | 1 | 2.78247 | 2.78247 | −269.34% | 8.91% | 287.15% |
| 50 | 7.071067812 | 2.78247 | 0.39350 | −30.44% | 8.91% | 48.26% |
| 100 | 10 | 2.78247 | 0.27825 | −18.92% | 8.91% | 36.73% |
| 175 | 13.22875656 | 2.78247 | 0.21034 | −12.13% | 8.91% | 29.94% |
| 1000 | 31.6227766 | 2.78247 | 8.80% | 0.11% | 8.91% | 17.71% |
| 10,000 | 100 | 2.78247 | 0.02782 | 6.12% | 8.91% | 11.69% |
| 32,768 | 181.019336 | 2.78247 | 0.01537 | 7.37% | 8.91% | 10.44% |
| 1,000,000 | 1000 | 2.78247 | 0.00278 | 8.63% | 8.91% | 9.19% |
| 10,000,000 | 3162.27766 | 2.78247 | 0.00088 | 8.82% | 8.91% | 8.99% |

TABLE 7

Super! Double-Zero Roulette 18 Number (One 4X Bonus Multiplier)
Calculations based on 1 unit wagered (i.e. $1.00)

| A<br>Net Pay | B<br>Probability | C<br>Sum (A × B) | D<br>mean | E<br>$x_i$ − mean | F<br>$E^2$ | G<br>B × F |
|---|---|---|---|---|---|---|
| $1.00 | 0.52632 | 0.52632 | 0.06721 | 0.93279 | 0.87010 | 0.45795 |
| $(0.90) | 0.46154 | −0.41538 | 0.06721 | −0.96721 | 0.93549 | 0.43176 |
| $(3.60) | 0.01215 | −0.04372 | 0.06721 | −3.66721 | 13.44840 | 0.16334 |
| | 1.00000 | 0.06720648 | | | | 1.05305 |
| | | MEAN (EV) | | | | VARIANCE |
| | | 6.72 | Hold % | | | 1.026184262 |
| | | | | | | SD |

| Z | corresponding C.I. |
|---|---|
| 1.65 | 90% |
| 1.96 | 95% |

| (A) | (B)<br>B | (C)<br>(z)(SD) | (D) | (E) | (F) | (G) |
|---|---|---|---|---|---|---|
| | | | | Hold Percentage Confidence Interval | | |
| games played | sqrt(qames) | Z = 1.96 | (z*sd)/(col B) | lower | mean | upper |
| 1 | 1 | 2.01132 | 2.01132 | −194.41% | 6.72% | 207.85% |
| 50 | 7.071067812 | 2.01132 | 0.28444 | −21.72% | 6.72% | 35.17% |
| 100 | 10 | 2.01132 | 0.20113 | −13.39% | 6.72% | 26.83% |
| 175 | 13.22875656 | 2.01132 | 0.15204 | −8.48% | 6.72% | 21.92% |
| 1,000 | 31.6227766 | 2.01132 | 6.36% | 0.36% | 6.72% | 13.08% |
| 10,000 | 100 | 2.01132 | 0.02011 | 4.71% | 6.72% | 8.73% |
| 32,768 | 181.019336 | 2.01132 | 0.01111 | 5.61% | 6.72% | 7.83% |
| 1,000,000 | 1000 | 2.01132 | 0.00201 | 6.52% | 6.72% | 6.92% |
| 10,000,000 | 3162.27766 | 2.01132 | 0.00064 | 6.66% | 6.72% | 6.78% |

Based on the foregoing, it can be appreciated that a variety of embodiments are disclosed related to an electronic roulette gaming system and method. For example, in an embodiment, an electronic roulette gaming system can include a primary roulette wheel having a plurality of ball pockets and a circular runway for rotating a game ball within the primary roulette wheel, and a secondary multiplier bonus wheel rotating within the vicinity of the primary roulette wheel in order to provide a multiplied potential win for a player in a casino. Additionally, a bonus spot can be provided, which includes a hole and a path located on the primary roulette wheel for transferring the game ball from the primary roulette wheel to the secondary multiplier bonus wheel when the game ball lands upon the bonus spot of the primary roulette wheel.

In another embodiment, a multimedia device can be included for generating an animation and a sound during transfer of the game ball from the primary roulette wheel to the secondary multiplier bonus wheel in order to enhance a spontaneity and an excitement of the player within a video-simulated casino environment. Yet another embodiment can include an electronic display for displaying the primary roulette wheel and secondary multiplier bonus wheel and an input device operably associated with the electronic display for entering an individual number and a betting selection by the player in the casino environment. In still another embodiment, the secondary multiplier bonus wheel can comprise a standard set multiplier and/or the secondary multiplier bonus wheel can comprise a mystery set multiplier. In still other embodiments, the multimedia device can comprise a speaker for playing audio and/or can be an electronic display. Additionally, the input device can be, in some embodiments, a touch screen, a roller ball, a touch pad, a mouse, a push button or other appropriate types of input devices. Additionally, in some embodiments, the aforementioned game ball can be a graphical-simulated game ball. Other embodiments can include a pay table for displaying a bonus wheel payout and providing a straight-up single number bet pay with respect to the player.

In yet another embodiment, an electronic roulette gaming system can include a primary roulette wheel having a plurality of ball pockets and a circular runway for rotating a game ball within the primary roulette wheel, and a secondary multiplier bonus wheel rotating within the vicinity of the primary roulette wheel in order to provide a multiplied potential win for a player in a casino. Such an embodiment can also include a bonus spot with a hole and a path located on the primary roulette wheel for transferring the game ball from the primary roulette wheel to the secondary multiplier bonus wheel when the game ball lands upon the bonus spot of the primary roulette wheel; and a multimedia device for generating an animation and a sound during transfer of the game ball from the primary roulette wheel to the secondary multiplier bonus wheel in order to enhance a spontaneity and an excitement of the player within a video-simulated casino environment.

Another embodiment of such a system can include an electronic display for displaying the primary roulette wheel and secondary multiplier bonus wheel; and an input device operably associated with the electronic display for entering an individual number and a betting selection by the player in the casino environment. A further embodiment of such a system can include the secondary multiplier bonus wheel configured to comprise at least one of a standard set multiplier and a mystery set multiplier. Yet another embodiment of such a system can include the multimedia device configured to include at least a speaker for playing audio and additionally an electronic display, wherein the aforementioned game ball comprises a graphical-simulated game ball. Another embodiment of such a system can also include a pay table for displaying a bonus wheel payout and providing a straight-up single number bet pay with respect to the player.

It can be further appreciated based on the foregoing that various methods can be provided in accordance with varying embodiments. For example, one possible embodiment can be an electronic roulette gaming method that includes the step of providing a primary roulette wheel having a plurality of ball pockets and a circular runway for rotating a game ball within the primary roulette wheel, the primary roulette wheel configured with a bonus spot with a hole and a path. Such a method can further include a step of rotating a secondary multiplier bonus wheel within a vicinity of the primary roulette wheel in order to provide a multiplied potential win for a player in a casino, and a step of transferring the game ball from the primary roulette wheel to the secondary multiplier bonus wheel when the game ball lands upon the bonus spot of the primary roulette wheel.

An alternative embodiment of such a method can include a step of configuring a multimedia device for generating an animation and a sound during transfer of the game ball from the primary roulette wheel to the secondary multiplier bonus wheel in order to enhance a spontaneity and an excitement of the player within a video-simulated casino environment. Another embodiment of such a method can include the steps of graphically displaying, via an electronic display, the primary roulette wheel and secondary multiplier bonus wheel; and associating an input device with the electronic display in order to input an individual number and a betting selection by the player. Additionally, in such a method, the secondary multiplier bonus wheel can be a standard set multiplier, a mystery set multiplier, or a combination thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An electronic roulette gaming system, comprising:

an electronic display that graphically displays:

a graphical digital representation of a primary roulette wheel having a plurality of ball pockets and a circular runway for graphically rotating a graphical representation of a game ball within said primary roulette wheel;

a graphical digital representation of secondary multiplier bonus wheel rotating within a vicinity of said primary roulette wheel in order to provide a multiplied potential win for a player in a casino; and a graphical digital representation of a bonus spot with a hole and a path located on said primary roulette wheel for transferring said game ball from said primary roulette to said secondary multiplier bonus wheel when said game ball lands upon said bonus spot of said primary roulette wheel.

2. The system of claim 1 further comprising a multimedia device for generating an animation and a sound during transfer of said game ball from said primary roulette wheel to said secondary multiplier bonus wheel in order to enhance a spontaneity and an excitement of said player within a video-simulated casino environment that is simulated via said electronic display and graphically provide said player with a digital representation of an enhanced roulette game.

3. The system of claim 2 further comprising:

an input device operably associated with said electronic display for entering an individual number and a betting selection by said player in a video-simulated casino environment; and an authentication module for authenticating said player for wagering via said electronic roulette gaming system.

4. The system of claim 3 wherein said secondary multiplier bonus wheel comprises a standard set multiplier.

5. The system of claim 4 wherein said secondary multiplier bonus wheel further comprises a mystery set multiplier.

6. The system of claim 3 wherein said multimedia device comprises a speaker for playing audio and wherein said multimedia device comprises said electronic display.

7. The system of claim 3 wherein said primary roulette wheel comprises at least one numbered pocket bearing marks around a periphery of said at least one numbered pocket, wherein said at least one numbered pocket in said primary roulette wheel is graphically displayed with at least one particular color based on a background on which a number thereof is marked and wherein said at least one numbered pocket in said primary roulette wheel is formed by a divider and referred to by a corresponding field.

8. The system of claim 7 wherein said input device comprises at least one of the following types of input devices:

a touch screen;

a roller ball;

a touch pad;

a mouse; and a push button.

9. The system of claim 7 wherein said game ball comprises a graphical-simulated game ball.

10. The system of claim 7 further comprising a graphically displayed pay table for displaying via said electronic display, a bonus wheel payout and providing a straight-up single number bet pay with respect to said player.

11. An electronic roulette gaming system, comprising:

an electronic display that graphically displays:

a graphical digital representation of a primary roulette wheel having a plurality of ball pockets and a circular runway for graphically rotating a graphical representation of a game ball within said primary roulette wheel;

a graphical digital representation of a secondary multiplier bonus wheel rotating within a vicinity of said primary roulette wheel in order to provide a multiplied potential win for a player in a casino; and a graphical digital representation of a bonus spot with a hole and a path located on said primary roulette wheel for transferring said game ball from said primary roulette wheel to said secondary multiplier bonus wheel when said game ball lands upon said bonus spot of said primary roulette wheel;

a multimedia device for generating an animation and a sound during transfer of said game ball from said primary roulette wheel to said secondary multiplier bonus wheel in order to enhance a spontaneity and an excitement of said player within a video-simulated casino environment;

an authentication module for authenticating said player for wagering via said electronic roulette gaming system; and a random number generator that automatically selects at least one multiplier value with respect to said secondary multiplier bonus wheel.

12. The system of claim 11 further comprising:

an input device operably associated with said electronic display for entering an individual number and a betting selection by said player in said casino environment.

13. The system of claim 12 wherein said secondary multiplier bonus wheel comprises at least one of a standard set multiplier and a mystery set multiplier.

14. The system of claim 12 wherein:

said multimedia device comprises at least a speaker for playing audio and comprises said electronic display; and said game ball comprises a graphical-simulated game ball capable of being displayed within said electronic display.

15. The system of claim 14 further comprising a pay table for displaying a bonus wheel payout and providing a straight-up single number bet pay with respect to said player.

16. An electronic roulette gaming method, comprising:

authenticating a player for wagering via an electronic roulette gaming system having an electronic display;

if said player is authenticated, displaying via said electronic display, a graphical digital representation of a primary roulette wheel having a plurality of ball pockets and a circular runway for graphically rotating a graphical representation of a game ball within said primary roulette wheel, said primary roulette wheel configured with a bonus spot with a hole and a path;

graphically rotating within said electronic display, a graphical digital representation of a secondary multiplier bonus wheel within a vicinity of said primary roulette wheel in order to provide a multiplied potential win for a player in a casino; and graphically transferring within said electronic display, said game ball from said primary roulette wheel to said secondary multiplier bonus wheel when said game ball lands upon said bonus spot of said primary roulette wheel.

17. The method of claim 16 further comprising configuring a multimedia device for generating an animation and a sound during transfer of said game ball from said primary roulette wheel to said secondary multiplier bonus wheel in order to enhance a spontaneity and an excitement of said player within a video-simulated casino environment.

18. The method of claim 17 further comprising:

graphically displaying, via said electronic display, said graphical digital representation of a primary roulette wheel and secondary multiplier bonus wheel; and associating an input device with said electronic display in order to input an individual number and a betting selection by said player.

19. The method of claim 18 wherein said secondary multiplier bonus wheel comprises a standard set multiplier.

20. The method of claim 19 wherein said secondary multiplier bonus wheel further comprises a mystery set multiplier.

* * * * *